(12) United States Patent
Yadav et al.

(10) Patent No.: US 11,577,979 B1
(45) Date of Patent: Feb. 14, 2023

(54) PROCESSES FOR TREATMENT OF WASTEWATER

(71) Applicant: The University of British Columbia, Vancouver (CA)

(72) Inventors: Vikramaditya Ganapati Yadav, Vancouver (CA); Gaurav Subedi, Vancouver (CA); Rohan Sharma, Vancouver (CA); Arjun Milan Bhagwat, Vancouver (CA)

(73) Assignee: The University of British Columbia, Vancouver (CA)

( * ) Notice: Subject to any disclaimer, the term of this patent is extended or adjusted under 35 U.S.C. 154(b) by 20 days.

(21) Appl. No.: 17/387,714

(22) Filed: Jul. 28, 2021

(51) Int. Cl.
| | | |
|---|---|---|
| *C02F 9/00* | (2006.01) | |
| *C01F 11/06* | (2006.01) | |
| *H01M 8/16* | (2006.01) | |
| *C02F 103/10* | (2006.01) | |
| *C02F 3/34* | (2023.01) | |
| *C02F 1/66* | (2023.01) | |
| *C02F 3/12* | (2023.01) | |
| *C02F 101/20* | (2006.01) | |
| *C02F 3/00* | (2023.01) | |

(52) U.S. Cl.
CPC .............. *C02F 9/00* (2013.01); *C01F 11/06* (2013.01); *H01M 8/16* (2013.01); *C02F 1/66* (2013.01); *C02F 3/005* (2013.01); *C02F 3/1215* (2013.01); *C02F 3/34* (2013.01); *C02F 2101/203* (2013.01); *C02F 2103/10* (2013.01)

(58) Field of Classification Search
None
See application file for complete search history.

(56) References Cited

U.S. PATENT DOCUMENTS

| | | |
|---|---|---|
| 9,825,309 B2 | 11/2017 | Liu et al. |
| 2014/0083933 A1 | 3/2014 | Choi |
| 2022/0169908 A1* | 6/2022 | Phillips ................... C04B 28/10 |

FOREIGN PATENT DOCUMENTS

| | | | |
|---|---|---|---|
| CN | 112607966 A | * | 4/2021 |
| KR | 101654976 | | 1/2016 |
| KR | 2016007165 A | * | 1/2016 |
| KR | 101745115 | | 2/2016 |
| WO | WO 2009/040521 | | 4/2009 |

OTHER PUBLICATIONS

Ucar D, Zhang Y and Angelidaki I (2017) An Overview of Electron Acceptors in Microbial Fuel Cells. Front. Microbiol. 8:643. (Year: 2017).*

(Continued)

*Primary Examiner* — Chester T Barry
(74) *Attorney, Agent, or Firm* — Klarquist Sparkman, LLP (57) ABSTRACT

The present disclosure relates to processes for treating wastewater such as acid rock drainage. The processes may, for example, comprise subjecting the wastewater to a microbial fuel cell process, neutralizing the acid with a base comprising calcium to produce an aqueous composition comprising calcium ions and subjecting the aqueous composition comprising calcium ions to a biological precipitation process to precipitate the calcium ions as calcium carbonate.

20 Claims, 5 Drawing Sheets

(56) References Cited

OTHER PUBLICATIONS

H-C Tao et al., Removal of copper from aqueous solution by electrodeposition in cathode chamber of microbial fuel cell, J. Haz. Matl., 189 (2011) 186-192 (Year: 2011).*
Ai et al., "Effective treatment of acid mine drainage with microbial fuel cells: An emphasis on typical energy substrates," *Minerals* 10:443, May 15, 2020.
Bradshaw Research Initiative for Minerals and Mining (BRIMM), online advertisement for "Biotechnology for Exploration, Extraction, and Remediation" webinar https://brimm.ubc.ca/events/mining-microbiome-webinar/ Jul. 21, 2020.
Yadav, "Extraction of Low-grade Copper and Remediation of Acid Mine Drainage (AMD) through Sustainable Bioprocesses" webinar transcript (autogenerated from YouTube), Jul. 29, 2020.
Yadav, "Extraction of Low-grade Copper and Remediation of Acid Mine Drainage (AMD) through Sustainable Bioprocesses" webinar slides, Jul. 29, 2020.
Yadav, "Extraction of Low-grade Copper and Remediation of Acid Mine Drainage (AMD) through Sustainable Bioprocesses" YouTube posting of webinar https://www.youtube.com/watch?v=7arEUnaViHo, Sep. 8, 2020.

* cited by examiner

PROCESSES FOR TREATMENT OF WASTEWATER

FIELD

The present disclosure relates to processes for the treatment of wastewater such as acid rock drainage, the processes comprising the use of a microbial fuel cell process in combination with a biological precipitation process.

BACKGROUND

An average-sized open pit mine that annually yields 3 million tons of ore will typically also produce about 1.5 billion tons of waste rock and 12 billion gallons of wastewater during the course of ore extraction and beneficiation. The waste streams are typically consolidated and stored in tailings dams, where the co-localization of sulphides in the waste rock, oxygen, water and naturally occurring sulphur oxidising bacteria (SOB) generates a highly noxious waste stream often called acid rock drainage (ARD). The average pH of ARD ranges from about 2 to about 4.5 depending on the percentage of sulfur that is present in the form of sulphides in the waste rock and other effluent run-offs from the mines. An average-sized open pit mine has the potential to generate in excess of 240 million gallons of ARD each year, which would take 4500 tons of lime (CaO) to neutralize. Each ton of quicklime emits 0.78 tons of $CO_2$ during its manufacture, and the ensuing sludge, which could contain as much as 30 wt. % of solids, is disposed in a landfill in standard processes, which not only may incur a steep cost but also emits an appreciable tonnage of $CO_2$ into the atmosphere.

It is estimated that a mine will typically spend $2 million USD on the purchase of lime and $0.5 million USD on landfilling the sludge that is produced by neutralization. Passive methods such as ion exchange, membrane filtration and biological sulphate reduction may offer advantages such as separation of metal cations, sulphates and carbonates. However, these methods still generate sludge and incur heavy operational expenses in subsequent stages of managing and disposing sludge. Moreover, the isolated metal sulfides in mine waste are recovered through external voltage supply that requires a pre-treatment stage of pressure oxidation releasing toxic gases in the form of $SO_x$ and $NO_x$ emissions. Additionally, ARD also contains, on average, 3 g/L of metals such as but not limited to iron, zinc, copper, nickel, gold, silver and/or molybdenum, whose lost economic potential is estimated to be $20 billion USD in North America alone. ARD reduces the economic contribution of the mining sector, contributes a large share of its total greenhouse gas (GHG) emissions, and also incurs heavy liabilities and environmental clean-up costs.

SUMMARY

The processes for treatment of wastewater (e.g. acid rock drainage) of the present disclosure comprise the use of a microbial fuel cell process in combination with a biological precipitation process to produce water that is advantageously fit for discharge. The processes for treatment of wastewater of the present disclosure may, for example, significantly reduce lime consumption in comparison to standard processes for treatment of acidic wastewater such as acid rock drainage. The processes may also be used to recover metals of commercial interest, remove undesirable (e.g. toxic) metals and/or reduce sulfate concentration.

Accordingly, the present disclosure includes a process for treating wastewater, the process comprising: subjecting the wastewater to a microbial fuel cell process to produce an acidic aqueous composition; treating the acidic aqueous composition with a base comprising calcium to neutralize the acid and produce an aqueous composition comprising calcium ions; and subjecting the aqueous composition comprising calcium ions to a biological precipitation process to precipitate the calcium ions as calcium carbonate.

In an embodiment, the wastewater is an aqueous composition comprising dissolved metal and/or sulfate, and subjecting the aqueous composition comprising the dissolved metal and/or sulfate to the microbial fuel cell process produces an acidic aqueous composition having a reduced content of the dissolved metal and/or sulfate. In another embodiment, the wastewater is mine wastewater. In a further embodiment, the mine wastewater is acid rock drainage.

In an embodiment, the process further comprises calcination of the precipitated calcium carbonate to produce calcium oxide. In another embodiment, the process further comprises recycling the calcium oxide for use in treating the acidic aqueous composition.

In an embodiment, the microbial fuel cell process comprises a two-chambered microbial fuel cell or three-chambered microbial fuel cell. In another embodiment, the microbial fuel cell process comprises the two-chambered microbial fuel cell and: (a) the two-chambered microbial fuel cell comprises an anodic cell separated from a cathodic cell by a proton exchange membrane (PEM), the anodic cell comprising an anode, and housing an exoelectrogenic microorganism and an organic substrate therefor, and the cathodic cell comprising a cathode, and wherein the wastewater is introduced into the cathodic cell of the two-chambered microbial fuel cell; (b) the two-chambered microbial fuel cell comprises an anodic cell separated from a cathodic cell by an anion exchange membrane (AEM), the anodic cell comprising an anode, and housing a mixture of sulfate-reducing bacteria (SRB) and sulfide-oxidizing bacteria (SOB) and an organic substrate therefor, and the cathodic cell comprising a cathode, and wherein the wastewater is introduced into the cathodic cell of the two-chambered microbial fuel cell; or (c) the two-chambered microbial fuel cell comprises an anodic cell separated from a cathodic cell by an anion exchange membrane (AEM), the anodic cell comprising a first electrode and a second electrode, and housing an exoelectrogenic microorganism, a mixture of sulfate-reducing bacteria (SRB) and sulfide-oxidizing bacteria (SOB), and an organic substrate therefor, the first electrode proximal to the AEM and for catalyzing conversion of sulfate to sulfur and/or sulfides by the mixture of SRB and SOB, and the second electrode distal to the AEM and for catalyzing oxidation of the organic substrate by the exoelectrogenic microorganism, and the cathodic cell comprising a cathode, and wherein the wastewater is introduced into the cathodic cell of the two-chambered microbial fuel cell; or the microbial fuel cell process comprises the three-chambered microbial fuel cell, wherein the three-chambered microbial fuel cell comprises a first anodic cell separated from a cathodic cell by a proton exchange membrane (PEM), the first anodic cell housing an exoelectrogenic microorganism and an organic substrate therefor, and a second anodic cell separated from the cathodic cell by an anion exchange membrane (AEM), the second anodic cell comprising a second anode and housing a mixture of sulfate-reducing bacteria (SRB) and sulfide-oxidizing bacteria (SOB) and an organic substrate therefor, and wherein the wastewater is introduced into the cathodic cell of the three-chambered microbial fuel cell.

In an embodiment, the exoelectrogenic microorganism comprises *Shewanella oneidensis, Geobacter sulfurreducens, Desulfovibrio vulgaris* or combinations thereof; wherein the sulfide-oxidizing bacteria comprise *Acidithiobacillus, Aquaspirillum, Aquifex, Bacillus, Desulfobulbus, Chlorobium, Methylobacterium, Paracoccus, Pseudomonas, Starkeya, Thermithiobacillus, Xanthobacter* or combinations thereof; and/or wherein the sulfate-reducing bacteria comprise *Desulfovibrio*. In another embodiment, the sulfate-reducing bacteria comprise *Desulfovibrio* and the sulfide-oxidizing bacteria comprise *Desolfobulbus*.

In an embodiment, the wastewater is an aqueous composition comprising dissolved metal and wherein at least one dissolved metal is deposited as the metal or an oxide thereof on the cathode and/or wherein at least one dissolved metal is precipitated as the metal or a complex thereof in the cathodic cell. In another embodiment, the at least one metal or the oxide thereof deposited on the cathode comprises zinc, nickel, copper, mercury, silver, gold, uranium, arsenic, selenium, bismuth, molybdenum, manganese or combinations thereof. In a further embodiment, the process further comprises introducing oxygen into the cathodic cell to precipitate the metal or the complex thereof. In another embodiment, the dissolved metal comprises dissolved copper and dissolved iron, at least a portion of the dissolved copper is deposited as copper metal on the cathode and at least a portion of the dissolved iron is precipitated as iron hydroxides and/or oxides in the cathodic cell.

In an embodiment, the process further comprises recovering the at least one dissolved metal deposited as the metal or the oxide thereof and/or precipitated as the metal or the complex thereof.

In an embodiment, the process further comprises adjusting pH of the wastewater to a range of about 1.5 to about 3.5 prior to introduction into the cathodic cell.

In an embodiment, the process further comprises directing carbon dioxide produced during the process for treatment of wastewater to a process comprising a carboxydogenic microorganism to regenerate the organic substrate for use in the process.

In an embodiment, treatment of the acidic aqueous composition with the base comprising calcium produces calcium sulfate, and the process further comprises dissolving the calcium sulfate to release calcium ions and produce the aqueous composition comprising calcium ions.

In an embodiment, the base comprising the calcium comprises calcium oxide, calcium hydroxide or combinations thereof. In another embodiment, the base comprises the calcium oxide.

In an embodiment, the biological precipitation process comprises calcium precipitation that is microbially induced. In another embodiment, the microorganism for the calcium precipitation comprises *Sporosarcina pasteurii, Bacillus firmus* or combinations thereof.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should rather be given the broadest interpretation consistent with the description as a whole.

DETAILED DESCRIPTION

I. Definitions

Unless otherwise indicated, the definitions and embodiments described in this and other sections are intended to be applicable to all embodiments and aspects of the disclosure herein described for which they would be understood to be suitable by a person skilled in the art.

Terms of degree such as "about" and "approximately" as used herein mean a reasonable amount of deviation of the modified term such that the end result is not significantly changed. These terms of degree should be construed as including a deviation of at least ±5% of the modified term if this deviation would not negate the meaning of the term it modifies.

The term "and/or" as used herein means that the listed items are present, or used, individually or in combination. In effect, this term means that "at least one of" or "one or more" of the listed items is present or used.

As used in this disclosure, the singular forms "a", "an" and "the" include plural references unless the content clearly dictates otherwise.

As used herein, the words "comprising" (and any form thereof, such as "comprise" and "comprises"), "having" (and any form thereof, such as "have" and "has"), "including" (and any form thereof, such as "include" and "includes") or "containing" (and any form thereof, such as "contain" and "contains"), are inclusive or open-ended and do not exclude additional, unrecited elements or process/method steps. As used herein, the word "consisting" and its derivatives are intended to be close-ended terms that specify the presence of the stated features, elements, components, groups, integers and/or steps, and also exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of these features, elements, components, groups, integers and/or steps.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product.

II. Processes and Uses

Figure 1:
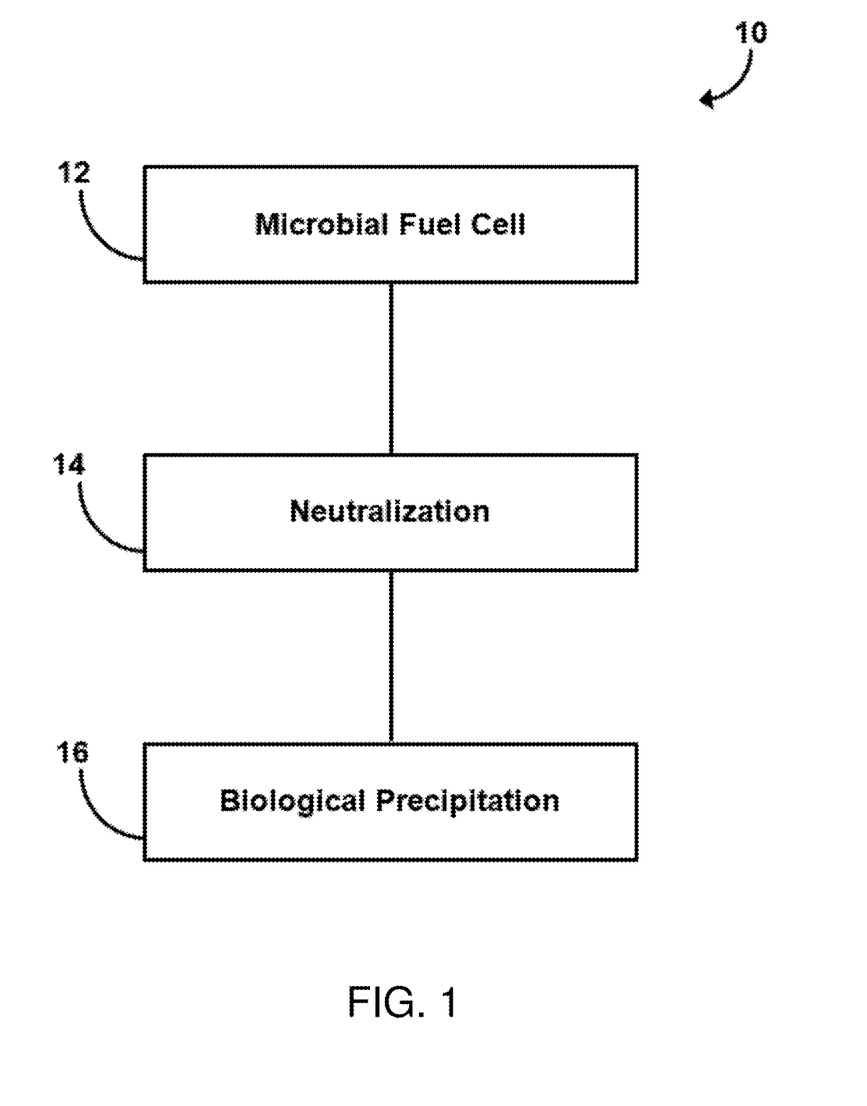
FIG. 1 is a schematic diagram of a process for treating wastewater according to an embodiment of the present disclosure.

An exemplary process flow diagram is shown in FIG. 1. The exemplified process 10 is a process for treating wastewater. Referring to FIG. 1, in the exemplified process 10, the wastewater is subjected to a microbial fuel cell process 12 to produce an acidic aqueous composition. The acidic aqueous composition is treated with a base comprising calcium (e.g. calcium oxide, calcium hydroxide or combinations thereof) to neutralize the acid 14 and produce an aqueous composition comprising calcium ions. The aqueous composition comprising calcium ions is subjected to a biological precipitation process 16 to precipitate the calcium ions as calcium carbonate. The water obtained from the treatment is, for example, rendered fit for discharge. The processes for treatment of wastewater of the present disclosure may, for example, significantly reduce lime consumption in comparison to standard processes for treatment of acidic wastewater such as acid rock drainage. The processes may also be used to recover metals of commercial interest, remove undesirable (e.g. toxic) metals and/or reduce sulfate concentration.

Accordingly, the present disclosure includes a process for treating wastewater, the process comprising: subjecting the wastewater to a microbial fuel cell process to produce an acidic aqueous composition; treating the acidic aqueous composition with a base comprising calcium to neutralize the acid and produce an aqueous composition comprising calcium ions; and subjecting the aqueous composition comprising calcium ions to a biological precipitation process to precipitate the calcium ions as calcium carbonate.

The term "wastewater" as used herein includes water comprising at least one component dissolved therein (e.g. dissolved metal and/or sulfate) which is removable by a process for treating wastewater as described herein and/or water which is acidic and is neutralizable by a process for treating wastewater as described herein. In an embodiment, the wastewater is an aqueous composition comprising dissolved metal and/or sulfate. In an embodiment, the wastewater is an aqueous composition comprising dissolved metal. In another embodiment, the wastewater is an aqueous composition comprising sulfate. In a further embodiment, the wastewater is an aqueous composition comprising dissolved metal and sulfate. In an embodiment, the wastewater is an aqueous composition comprising dissolved metal and/or sulfate, and subjecting the aqueous composition comprising the dissolved metal and/or sulfate to the microbial fuel cell process produces an acidic aqueous composition having a reduced content of the dissolved metal and/or sulfate. For example, in some embodiments of the present disclosure, the aqueous composition comprising the dissolved metal and/or sulfate comprises dissolved metal and sulfate and subjecting the aqueous composition comprising the dissolved metal and sulfate to the microbial fuel cell process produces an acidic aqueous composition having a reduced content of the dissolved metal, an acidic aqueous composition having a reduced content of the sulfate or an acidic aqueous composition having a reduced content of both the dissolved metal and the sulfate. In an embodiment, subjecting the aqueous composition comprising the dissolved metal and sulfate to the microbial fuel cell process produces an acidic aqueous composition having the reduced content of both the dissolved metal and the sulfate. In an embodiment, the wastewater is industrial wastewater. In an embodiment, the wastewater comprises mine wastewater. In another embodiment, the wastewater is mine wastewater. In an embodiment, the mine wastewater is acid rock drainage.

In an embodiment, the process further comprises calcination of the precipitated calcium carbonate to produce calcium oxide. Processes for calcination of precipitated calcium carbonate to oxidize the calcium carbonate to produce the calcium oxide (CaO) are well known in the art and a suitable process, means and/or conditions for carrying out the calcination of the precipitated calcium carbonate to produce the calcium carbonate in the processes of the present disclosure can be selected by the person skilled in the art. For example, in an embodiment, the calcination comprises separating the precipitated calcium carbonate then heating the calcium carbonate at a suitable temperature (e.g. a temperature above the decomposition temperature of the calcium carbonate such as a temperature in the range of from about 900° C. to about 1050° C.) in the absence or limited supply of air or oxygen to produce the calcium oxide.

In an embodiment, the process further comprises recycling the calcium oxide for use in treating the acidic aqueous composition.

The microbial fuel cell process can comprise any suitable microbial fuel cell, the selection of which can be made by a person skilled in the art having regard to the present disclosure. For example, a person skilled in the art would appreciate that a suitable microbial fuel cell comprises a cathodic cell comprising a cathode and an anodic cell comprising an anode. In an embodiment, the microbial fuel cell process comprises a two-chambered microbial fuel cell or three-chambered microbial fuel cell. The term "two-chambered microbial fuel cell" as used herein refers to a microbial fuel cell comprising a single cathodic cell and a single anodic cell. The term "three-chambered microbial fuel cell" as used herein refers to a microbial fuel cell comprising a single cathodic cell and two anodic cells. In another embodiment, the microbial fuel cell process comprises a two-chambered microbial fuel cell. In a further embodiment, the microbial fuel cell process comprises a three-chambered microbial fuel cell.

In an embodiment, the microbial fuel cell process comprises the two-chambered microbial fuel cell, and the two-chambered microbial fuel cell comprises an anodic cell separated from a cathodic cell by a proton exchange membrane (PEM), the anodic cell comprising an anode, and housing an exoelectrogenic microorganism and an organic substrate therefor, and the cathodic cell comprising a cathode, and wherein the wastewater is introduced into the cathodic cell of the two-chambered microbial fuel cell.

Figure 2:
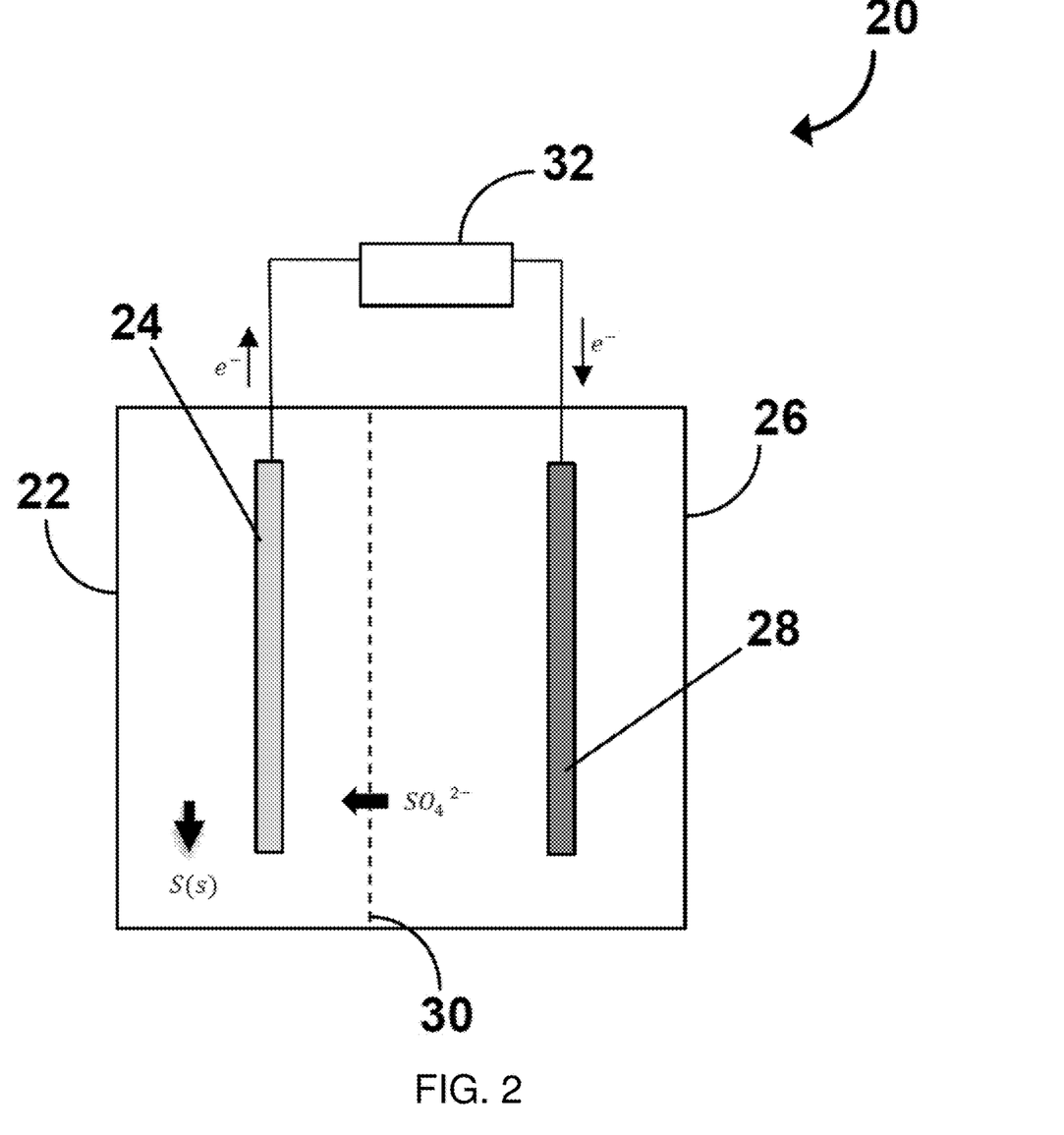
FIG. 2 is a schematic of an exemplary two-chambered microbial fuel cell according to an embodiment of the present disclosure.
Figure 3:
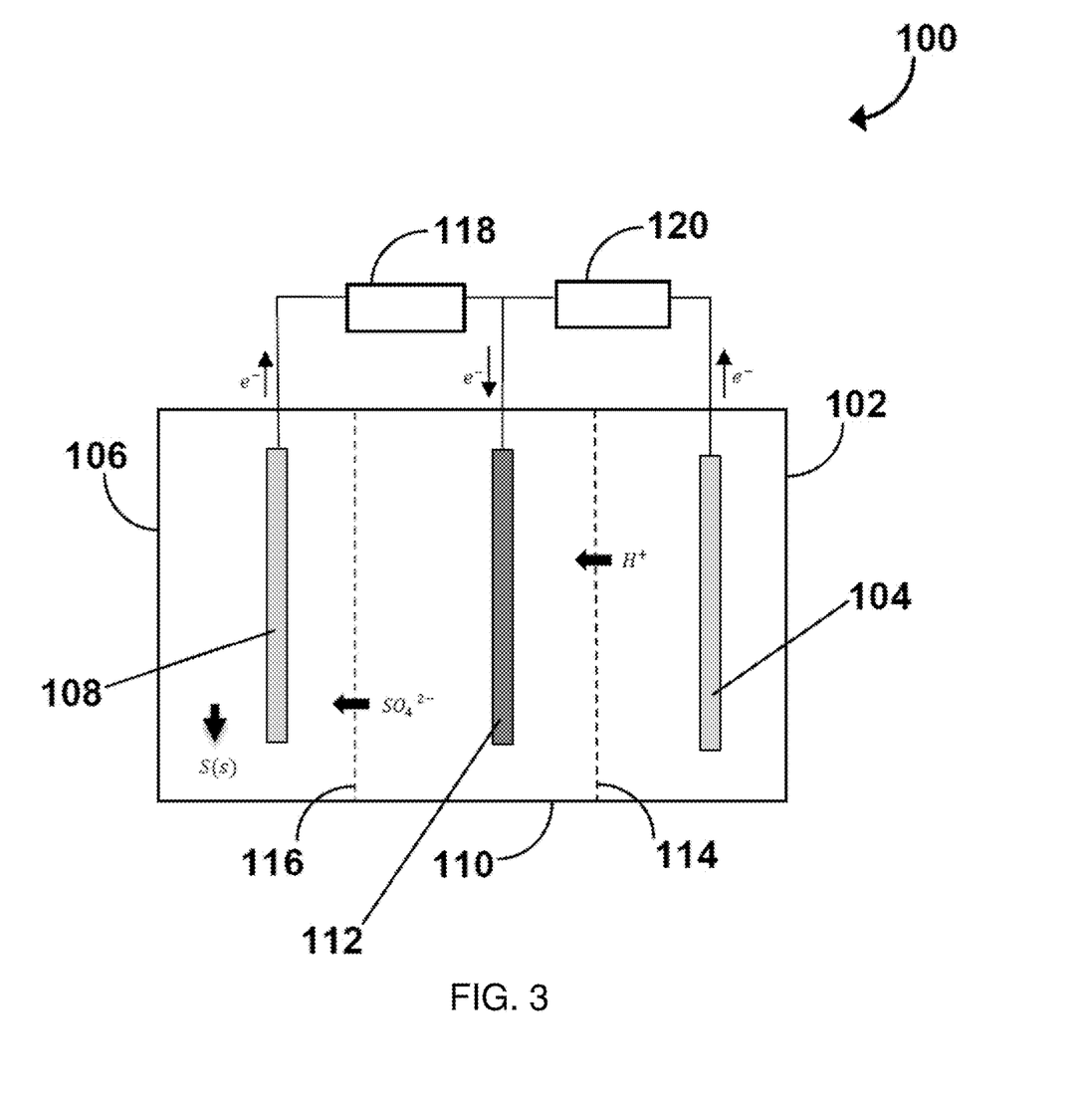
FIG. 3 is a schematic of an exemplary three-chambered microbial fuel cell according to an embodiment of the present disclosure.

Wastewater comprising sulfate may, for example, be deleterious to certain proton exchange membranes and desirably is treated to produce a non-acid generating stream. Accordingly, in an embodiment, the microbial fuel cell process comprises the two-chambered microbial fuel cell, and the two-chambered microbial fuel cell comprises an anodic cell separated from a cathodic cell by an anion exchange membrane (AEM), the anodic cell comprising an anode, and housing a mixture of sulfate-reducing bacteria (SRB) and sulfide-oxidizing bacteria (SOB) and an organic substrate therefor, and the cathodic cell comprising a cathode, and wherein the wastewater is introduced into the cathodic cell of the two-chambered microbial fuel cell. A schematic of an example of such a two-chambered microbial fuel cell 20 is depicted in FIG. 2. Referring to FIG. 2, the exemplified two-chambered microbial fuel cell 20 comprises anodic cell 22 which comprises an anode 24 and houses a mixture of sulfate-reducing bacteria (SRB) and sulfide-oxidizing bacteria (SOB) and an organic substrate therefor (not shown) and a cathodic cell 26 which comprises a cathode 28. The anodic cell and cathodic cell are separated by an anion exchange membrane 30 which is permeable to sulfate. In some embodiments, the sulfate can be converted as described in greater detail hereinbelow to elemental sulfur. Also shown in FIG. 2 is resistor 32. In another embodiment, the microbial fuel cell process comprises the two-chambered microbial fuel cell, and the two-chambered microbial fuel cell comprises an anodic cell separated from a cathodic cell by an anion exchange membrane (AEM), the anodic cell comprising a first electrode and a second electrode, and housing an exoelectrogenic microorganism, a mixture of sulfate-reducing bacteria (SRB) and sulfide-oxidizing bacteria (SOB), and an organic substrate therefor, the first electrode proximal to the AEM and for catalyzing conversion of sulfate to sulfur and/or sulfides by the mixture of SRB and SOB, and the second electrode distal to the AEM and for catalyzing oxidation of the organic substrate by the exoelectrogenic microorganism, and the cathodic cell comprising a cathode, and wherein the wastewater is introduced into the cathodic cell of the two-chambered microbial fuel cell. In another embodiment, the microbial fuel cell process comprises the three-chambered microbial fuel cell, wherein the three-chambered microbial fuel cell comprises a first anodic cell separated from a cathodic cell by a proton exchange membrane (PEM), the first anodic cell housing an exoelectrogenic microorganism and an organic substrate therefor, and a second anodic cell separated from the cathodic cell by an anion exchange membrane (AEM), the second anodic cell comprising a second anode and housing a mixture of sulfate-reducing bacteria (SRB) and sulfide-oxidizing bacteria (SOB) and an organic substrate therefor, and wherein the wastewater is introduced into the cathodic cell of the three-chambered microbial fuel cell. It will be appreciated by a person skilled in the art that the first anodic cell and second anodic cell are configured such that they are not adjacent to nor in contact with each other. A schematic of an example of such a three-chambered microbial fuel cell 100 is depicted in FIG. 3. Referring to FIG. 3, the exemplified three-chambered microbial fuel cell 100 comprises first anodic cell 102 which comprises a first anode 104 and houses an exoelectrogenic microorganism and an organic substrate therefor (not shown), a second anodic cell 106 comprising a second anode 108 and houses a mixture of sulfate-reducing bacteria (SRB) and sulfide-oxidizing bacteria (SOB) and an organic substrate therefor (not shown) and a cathodic cell 110 which comprises a cathode 112. The first anodic cell 102 and cathodic cell 110 are separated by a proton exchange membrane 114 which is permeable to protons. The second anodic cell 106 and cathodic cell 110 are separated by an anion exchange membrane 116 which is permeable to sulfate. In some embodiments, the sulfate can be converted as described in greater detail hereinbelow to elemental sulfur. Also shown in FIG. 3 is first resistor 118 and second resistor 120.

It will be appreciated by a person skilled in the art that embodiments wherein an anodic cell houses a mixture of sulfate-reducing bacteria (SRB) and sulfide-oxidizing bacteria (SOB) the wastewater being introduced into the cathodic cell comprises sulfate. In some embodiments, the wastewater is the source of the sulfate. In other embodiments, a source of sulfate is added to the wastewater (e.g. sulfuric acid) prior to introduction into the cathodic cell.

The proton exchange membrane is any suitable proton exchange membrane, the selection of which can be made by a person skilled in the art. The term "proton exchange membrane" and abbreviation "PEM" as used herein refer to a semipermeable membrane sometimes also referred to in the art as a "polymer-electrolyte membrane" which is capable of passing protons but not electrons from an anodic cell to the cathodic cell in the microbial fuel cell. The proton exchange membrane is desirably at least substantially impermeable to gases, and resistant to the reducing environment at the cathode and oxidating environment at the anode. In an embodiment, the proton exchange membrane comprises a perfluorinated ionomer. In another embodiment, the perfluorinated ionomer is a perfluorosulfonic acid (PFSA) ionomer. In a further embodiment, the perfluorosulfonic acid ionomer comprises a polytetrafluoroethylene backbone having side chains of perfluorinated vinyl ethers which terminate in sulfonic acid groups. Commercially available examples of perfluorosulfonic acid ionomers include Nafion™, Flemion™, Hyflon™ and Aquivion™. In an embodiment, the proton exchange membrane is a Nafion membrane such as Nafion 117.

The anion exchange membrane is any suitable anion exchange membrane, the selection of which can be made by a person skilled in the art. The term "anion exchange membrane" and abbreviation "AEM" as used herein refer to a semipermeable membrane which is capable of passing anions from the cathodic cell to the anodic cell and/or from the anodic cell to the cathodic cell in the microbial fuel cell. For example, in embodiments wherein the catholyte comprises sulfate and the anodic cell from which the cathodic cell is separated by the anion exchange membrane houses the mixture of SRB and SOB, the anion exchange membrane desirably passes sulfate from the cathodic cell to the anodic cell. The person skilled in the art will appreciate that there may also, for example, be inflow of anions from the anodic cell to the cathodic cell such as organic substrate (e.g. lactate and/or acetate) and/or supporting anions. The anion exchange membrane is desirably at least substantially impermeable to gases, and resistant to the reducing environment at the cathode and oxidating environment at the anode. In an embodiment, the anion exchange membrane is a hydrocarbon-based anion exchange membrane e.g. a Selemion™ anion exchange membrane, a Fumasep™ FAP-450 membrane (a non-reinforced fluorinated anion exchange membrane), or a Fumasep™ FAA-3-PK-75 membrane (a reinforced anion exchange membrane).

The exoelectrogenic microorganism is any suitable exoelectrogenic microorganism, the selection of which can be made by a person skilled in the art. The term "exoelectrogenic microorganism" as used herein refers to a microorganism or a combination thereof capable of generating electrical energy by oxidation of an organic substrate and transferring the electrons to an extracellular electron acceptor, and includes both native and engineered forms thereof. In embodiments of the microbial fuel cell processes of the processes for treating wastewater of the present disclosure, the exoelectrogenic microorganism oxidizes the organic substrate to generate an electric current that is optionally consumed at the cathode. In an embodiment, the electric current is used in the electrodeposition of metals or oxides thereof on the cathode. In another embodiment, the electric current is used in the reduction of protons to generate hydrogen gas at the cathode. In some embodiments, the process further comprises directing the hydrogen thereby produced to a compressor for storage. In another embodiment, the process further comprises using the hydrogen as a fuel source to maintain temperature of the anodic cell in a range physiologically suitable for microorganisms housed therein. In an embodiment, the exoelectrogenic microorganism comprises *Shewanella oneidensis, Geobacter sulfurreducens, Desulfovibrio vulgaris* or combinations thereof. In another embodiment, the exoelectrogenic microorganism comprises *Shewanella oneidensis, Geobacter sulfurreducens* or combinations thereof. In another embodiment, the exoelectrogenic microorganism comprises *Shewanella oneidensis* MR-1. The selection of a suitable organic substrate for the exoelectrogenic microorganism can be made by a person skilled in the art and may depend, for example, on the identity of the exoelectrogenic microorganism. For example, lactate may be desirable in embodiments wherein the exoelectrogenic microorganism comprises *Shewanella oneidensis* and acetate may be desirable in embodiments wherein the exoelectrogenic microorganism comprises *Geobacter sulfurreducens*. In an embodiment, the organic substrate comprises a carboxylate (e.g. acetate, lactate or a combination thereof). Processes for culturing exoelectrogenic microorganisms are well known in the art and the selection of a suitable process, means and/or conditions for culturing the exoelectrogenic microorganisms for use in the microbial fuel cell processes of the processes for treating wastewater of the present application can be selected by the person skilled in the art. For example, in an embodiment, the exoelectrogenic microorganism is cultured in a minimal salt medium that has been supplemented with the desired concentration of the organic substrate.

The mixture of sulfate-reducing bacteria (SRB) and sulfide-oxidizing bacteria (SOB) is any suitable mixture of SRB and SOB, the selection of which can be made by a person skilled in the art. The term "sulfide-oxidizing bacteria" and abbreviation "SOB" as used herein refer to a bacteria or combination thereof capable of oxidizing hydrogen sulfide to produce disulfide, and includes native and engineered forms thereof. The term "sulfide-oxidizing bacteria" and abbreviation "SOB" as used herein also includes sulfide-oxidizing archaea or a combination thereof, including native and engineered forms thereof. In an embodiment, the sulfide-oxidizing bacteria comprise *Acidithiobacillus, Aquaspirillum, Aquifex, Bacillus, Desulfobulbus, Chlorobium, Methylobacterium, Paracoccus, Pseudomonas, Starkeya, Thermithiobacillus, Xanthobacter* or combinations thereof. In another embodiment, the sulfide-oxidizing bacteria comprise Desulfobulbus. The term "sulfate-reducing bacteria" and abbreviation "SRB" as used herein refer to a bacteria or combination thereof capable of respiration using sulfate as an electron acceptor, for example, to convert sulfate to hydrogen sulfide, and includes native and engineered forms thereof.

The term "sulfate-reducing bacteria" and abbreviation "SRB" as used herein also includes sulfate-reducing archaea or a combination thereof, including native and engineered forms thereof. In an embodiment, the sulfate-reducing bacteria comprise *Desulfovibrio*. In another embodiment, the sulfate-reducing bacteria comprise *Desulfovibrio* and the sulfide-oxidizing bacteria comprise *Desolfobulbus*. In embodiments of the microbial fuel cell processes of the processes for treating wastewater of the present disclosure, the SRB convert sulfate in an anodic cell to hydrogen sulfide, which is oxidized by SOB to produce disulfide and then a spontaneous electrochemical reaction converts the disulfide to elemental sulfur, thereby shuttling electrons to an anode. The selection of a suitable organic substrate for the mixture of SRB and SOB can be made by a person skilled in the art and may depend, for example, on the identity of the mixture of SRB and SOB. In an embodiment, the organic substrate comprises a carboxylate (e.g. acetate, lactate or a combination thereof). Processes for culturing SRB and SOB are well known in the art and the selection of a suitable process, means and/or conditions for culturing the SRB and/or SOB for use in the microbial fuel cell processes of the processes for treating wastewater of the present application can be selected by the person skilled in the art. In an embodiment, the SRB and/or SOB are cultured in a secondary culturing vessel for a suitable time (e.g. until the exponential phase of growth is reached) then introduced into the anodic cell at a desired cellular density. Alternatively, the SRB and/or SOB are inoculated directly into medium in the anodic cell.

The cathode, anode (or first anode and second anode, as the case may be), first electrode and second electrode are comprised of any suitable material or combinations thereof, the selection of which can be made by a person skilled in the art. In an embodiment, the cathode comprises a platinum-loaded carbon cloth electrode, stainless steel mesh, graphite felt, carbon paper with reduced graphene oxide or combinations thereof. In another embodiment, the cathode comprises a platinum-loaded carbon cloth electrode. In another embodiment, the anode comprises a porous graphite electrode, a porous graphite electrode doped with reduced graphene oxide, a graphite electrode doped with polypyrrole, carbon felt or combinations thereof. In another embodiment, the first anode and second anode each independently comprise a porous graphite electrode, a porous graphite electrode doped with reduced graphene oxide, a graphite electrode doped with polypyrrole, carbon felt or combinations thereof. In a further embodiment, the first electrode and the second electrode each individually comprise a porous graphite electrode, a porous graphite electrode doped with reduced graphene oxide, a graphite electrode doped with polypyrrole, carbon felt or combinations thereof. In another embodiment, the anode comprises a porous graphite electrode. In another embodiment, the first anode and second anode each comprise a porous graphite electrode. In a further embodiment, the first electrode and second electrode each individually comprise a porous graphite electrode.

The walls of the anodic cell(s) and cathodic cell are comprised of any suitable material, the selection of which can be made by a person skilled in the art. For example, it would be appreciated by a person skilled in the art that the walls of the anodic cell(s) and cathodic cell are desirably comprised of a material able to withstand the conditions of the anolyte(s) and catholyte, respectively, such as but not limited to the acidic conditions of the catholyte. In an embodiment, the walls comprise polyvinylidene fluoride (PVDF), polytetrafluoroethylene (PTFE), polycarbonate, a suitable 3D printable material or combinations thereof.

In an embodiment, the wastewater is an aqueous composition comprising dissolved metal and at least one dissolved metal is deposited as the metal or an oxide thereof on the cathode and/or wherein at least one dissolved metal is precipitated as the metal or a complex thereof in the cathodic cell. The term "dissolved metal" as used herein refers to a metal solubilized in the aqueous composition that is in ionic form (either individually or in the form of a complex ion) and includes metalloids such as but not limited to arsenic and/or selenium. In another embodiment, the wastewater is an aqueous composition comprising dissolved metal and at least one dissolved metal is deposited as the metal or an oxide thereof on the cathode. In another embodiment, the wastewater is an aqueous composition comprising dissolved metal and at least one dissolved metal is precipitated as the metal or a complex thereof in the cathodic cell. In a further embodiment, the wastewater is an aqueous composition comprising at least two dissolved metals and at least one of the dissolved metals is deposited as the metal or an oxide thereof on the cathode and at least one of the dissolved metals is precipitated as the metal or a complex thereof in the cathodic cell. In an embodiment, the at least one dissolved metal deposited as the metal or the oxide thereof on the cathode and the at least one metal or the complex thereof deposited in the cathodic cell are different. The identity of dissolved metal(s) in the wastewater may depend, for example, on the source of the wastewater. In an embodiment, the at least one metal or the oxide thereof deposited on the cathode comprises zinc, nickel, copper, mercury, silver, gold, uranium, arsenic, selenium, bismuth, molybdenum, manganese or combinations thereof. In another embodiment, the at least one metal is deposited on the cathode. In an embodiment, the at least one metal deposited on the cathode comprises selenium, zinc, nickel, copper, mercury, silver, gold or combinations thereof. In another embodiment, the at least one metal deposited on the cathode comprises copper. In another embodiment, the at least one metal oxide is deposited on the cathode. In an embodiment, the metal oxide comprises an oxide of uranium (e.g. uranium dioxide), an oxide of arsenic (e.g. arsenic oxide), an oxide of selenium, an oxide of bismuth, an oxide of molybdenum (e.g. hydrated molybdenum), an oxide of manganese or combinations thereof. In another embodiment, a combination of the at least one metal (as defined herein) and the at least one metal oxide (as defined here) is deposited on the cathode. In an embodiment, an external voltage is supplied to facilitate the deposition of the metal or the oxide thereof on the cathode. The selection of a suitable voltage for deposition of a particular metal, oxide thereof or combination thereof can be made by a person skilled in the art. Oxygen reduction in the cathodic cell may cause a decrease in acidity which may, for example, drive precipitation of the metal or the complex thereof. Accordingly, in an embodiment, the process further comprises introducing oxygen into the cathodic cell to precipitate the metal or the complex thereof. The source of oxygen can be any suitable source which can be readily selected by a person skilled in the art. For example, in an embodiment, the source of oxygen is air, oxygen gas, a secondary biological and/or chemical reaction or combinations thereof. In another embodiment, the source of oxygen is air, oxygen gas or combinations thereof. In another embodiment, the source of oxygen is air. In another embodiment, the oxygen is introduced into the cathodic cell via sparging. In an embodiment, at least a portion of the dissolved metal is precipitated as a metal hydroxide, a metal oxide or combinations thereof. For example, in an embodiment, the dissolved metal comprises dissolved iron and/or dissolved zinc, and at least a portion of the dissolved iron and/or zinc is precipitated as iron hydroxides, iron oxides and/or zinc hydroxide. In another embodiment, the dissolved metal comprises dissolved iron, and at least a portion of the dissolved iron is precipitated as iron hydroxides and/or oxides. In an embodiment, the dissolved iron is precipitated as ferric hydroxide (iron (III) hydroxide or $Fe(OH)_3$), ferrous hydroxide (iron (II) hydroxide or $Fe(OH)_2$) or combinations thereof. In an embodiment, the dissolved metal comprises dissolved copper and dissolved iron, at least a portion of the dissolved copper is deposited as copper metal on the cathode and at least a portion of the dissolved iron is precipitated as iron hydroxides and/or oxides in the cathodic cell.

In an embodiment, the process further comprises recovering at least one dissolved metal deposited as the metal or the oxide thereof and/or precipitated as the metal or the complex thereof. In another embodiment, the process further comprises recovering at least one dissolved metal deposited as the metal or the oxide thereof. In a further embodiment, the process further comprises recovering at least one dissolved metal precipitated as the metal or the complex thereof. In another embodiment, the process further comprises recovering at least one dissolved metal deposited as the metal or the oxide thereof and recovering at least one dissolved metal precipitated as the metal or the complex thereof. In an embodiment, the recovered dissolved metal comprises iron, zinc, copper, nickel, gold, silver and/or molybdenum.

In an embodiment, the acidic aqueous composition has a concentration of dissolved metal fit for discharge. Such concentrations can be measured by means well known in the art, for example, those described in Metal Mining Technical Guidance for Environmental Effects Monitoring, Chapter 5 Effluent Characterization and Water Quality Monitoring (https://www.ec.gc.ca/esee-eem/default.asp?lang=En&n=AEC7C481-1&offset=7&toc=show).

In some embodiments, the process further comprises adjusting pH of the wastewater to a range of about 1.5 to about 3.5 prior to introduction into the cathodic cell. In an embodiment, the pH is adjusted to a pH of less than about 2. The pH is adjusted by any suitable process, the selection of which can be readily made by a person skilled in the art. In an embodiment, the pH is adjusted via addition of a suitable acid. In an embodiment, the acid comprises sulfuric acid.

In an embodiment, the process further comprises directing carbon dioxide produced during the process for treatment of wastewater (i.e. at any step in the process that produces carbon dioxide) to a process comprising a carboxydogenic microorganism to regenerate the organic substrate for use in the process. For example, in an embodiment, the process further comprises directing carbon dioxide produced at the anode(s) or electrode(s) to a process comprising a carboxydogenic microorganism to regenerate the organic substrate for use in the process. In another embodiment, the process further comprises directing carbon dioxide produced during calcination to a process comprising a carboxydogenic microorganism to regenerate the organic substrate for use in the process. The carboxydogenic microorganism is any suitable carboxydogenic microorganism, the selection of which can be made by a person skilled in the art. The term "carboxydogenic microorganism" as used herein refers to a microorganism or a combination thereof capable of using carbon dioxide as a substrate for production of organic substrates and includes native and engineered forms thereof. For example, an acetogenic microorganism is capable of using carbon dioxide as a substrate for acetogenesis to regenerate acetate for use as an organic substrate in the process. In an embodiment, the acetogenic microorganism comprises *Clostridium ljungdahlii*. In another embodiment of the present disclosure, the process comprises directing carbon dioxide produced during the process (e.g. at the anode(s) or electrode(s) and/or during calcination) to a compressor for storage.

The base comprising the calcium is any suitable base comprising calcium. For example, it will be appreciated by a person skilled in the art that the base comprising calcium may, for example, desirably be cost-effective and/or does not generate significant heat from the neutralization. In an embodiment, the base comprising the calcium comprises calcium oxide, calcium hydroxide or combinations thereof. In another embodiment, the base comprises calcium oxide. In embodiments wherein the wastewater is, for example, acid rock drainage, the acidic aqueous composition produced by subjecting the acid rock drainage to the microbial fuel cell process is less acidic than the acid rock drainage. Accordingly, it can advantageously be neutralized with less base comprising calcium (e.g. calcium oxide, calcium hydroxide or combinations thereof) than would be used to neutralize, for example, acid rock drainage that had not been subjected to the microbial fuel cell process. The term "neutralization" as used herein in reference to neutralizing the acidic aqueous composition refers to addition of an amount of the base comprising calcium (e.g. calcium oxide, calcium hydroxide or combinations thereof) so that the pH of the resultant composition is at least about 7, for example a pH of about 7 or a pH in the range of about 7 to about 9. In an embodiment, treatment of the acidic aqueous composition with the base comprising calcium (e.g. calcium oxide, calcium hydroxide or mixtures thereof) produces calcium sulfate, and the process further comprises dissolving the calcium sulfate to release calcium ions and produce the aqueous composition comprising calcium ions. In an embodiment, the process comprises passing the neutralized aqueous composition to a dissolution tank to solubilize the calcium sulfate ($CaSO_4$ or gypsum), dissociating the calcium ions. In an embodiment, the acidic aqueous composition is treated with the calcium oxide. In another embodiment of the present disclosure, the acidic aqueous composition is treated with the calcium hydroxide. In a further embodiment, the acidic aqueous composition is treated with the combination of calcium oxide and calcium hydroxide.

In an embodiment, the biological precipitation process comprises calcium precipitation that is microbially induced. The microorganism for the calcium precipitation is any suitable microorganism or combination thereof, including native or engineered forms thereof. The mechanism of calcite precipitation is induced through increase in alkalinity and release of carbonate anion through degradation of urea by the microorganism. The process comprises a ureolytic pathway that promotes formation of calcite as a result of enzymatic activity of urease that is present in a ureolytic microorganism (e.g. bacteria). In an embodiment, the microbial precipitation of calcite comprises three primary steps:

Urea Hydrolysis: The urease enzyme hydrolyses urea into carbamate and releases ammonia. Carbamate is spontaneously converted into carbonic acid and ammonia.

$CO(NH_2)_2+H_2O \rightarrow NH_2COOH+NH_3$ $NH_2COOH+H_2O \rightarrow H_2CO_3+NH_3$

Induced Alkalinity: Carbonic anhydrase converts carbonic acid to bicarbonate while ammonia that is generated from urea hydrolysis turns into ammonium, releasing hydroxide ions for providing a favourable alkaline microenvironment around the cell.

$2NH_3+2H_2O \leftrightarrow 2NH_4^+ +2OH^-$ $H_2CO_3 \leftrightarrow HCO_3^- +H^+$ $HCO_3^- +H^+ +2OH^- \leftrightarrow CO_3^{2-} +H_2O$ Heterogenous Nucleation: The negatively charged functional groups in the cell wall bind the calcium ions to the surface of the cells. The subsequent development of calcite layers on the cell causes losses in transfer of nutrients causing death of the microorganism.

$Ca^{2+}+Cell \rightarrow Ca^{2+}-Cell$ $Ca^{2+}-Cell+CO_3^{2-} \rightarrow Cell+CaCO_3$ Accordingly, a person skilled in the art would appreciate that a suitable microorganism for the calcium precipitation may, for example, express active variants of the enzyme urease and carbonic anhydrase. In an embodiment, the microorganism for the calcium precipitation comprises *Sporosarcina pasteurii*, *Bacillus firmus* or combinations thereof. In an embodiment, the biological precipitation comprises passing the aqueous composition comprising the calcium ions to a nucleation vessel. In another embodiment, the microorganism for the calcium precipitation is cultured in a growth culture reactor then added to the aqueous composition comprising the calcium ions (e.g. in the nucleation vessel) for the biological precipitation process. In a further embodiment, the biological precipitation process comprises purging the aqueous composition comprising calcium ions with carbon dioxide.

Figure 4:
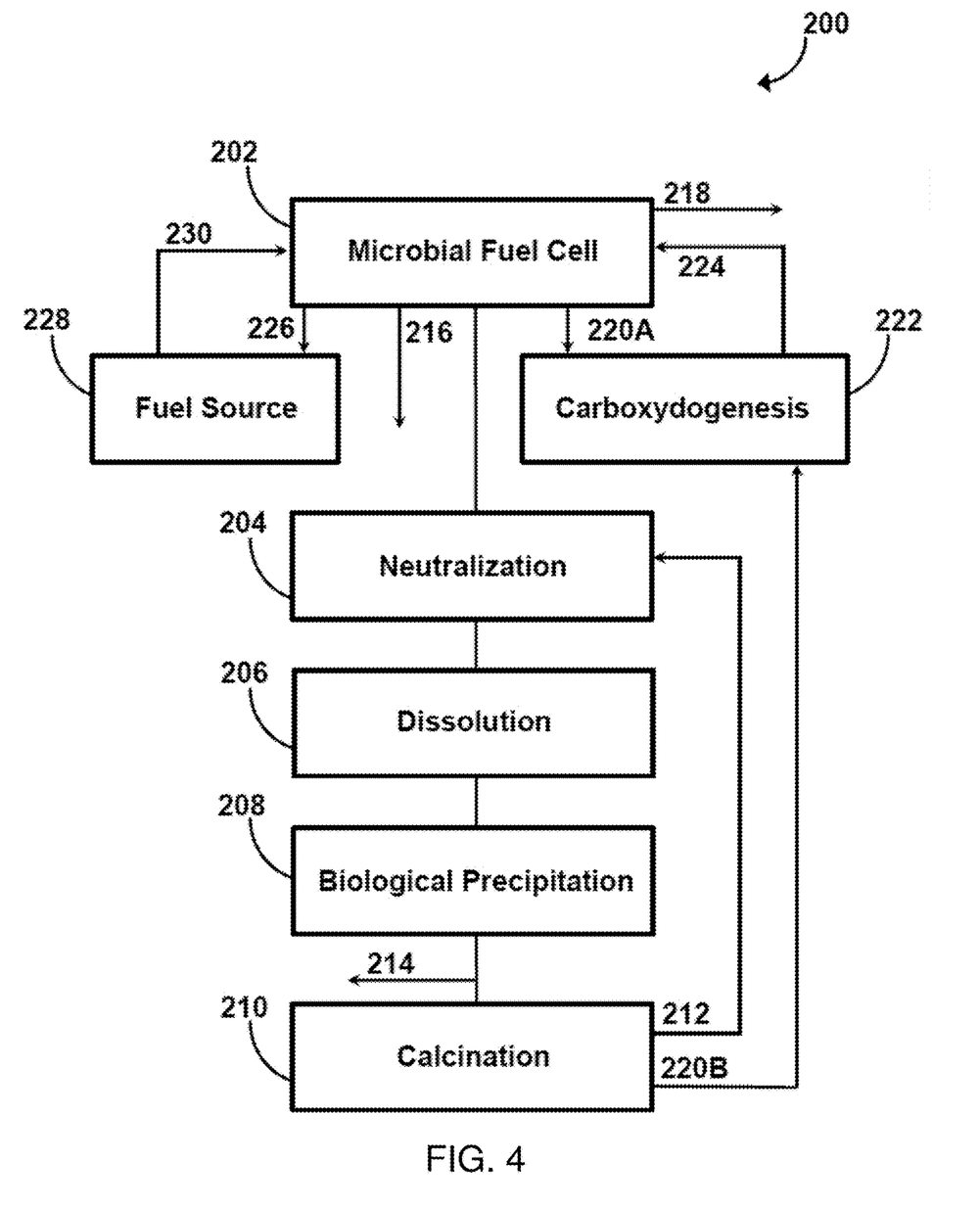
FIG. 4 is a schematic diagram of a process for treating wastewater according to another embodiment of the present disclosure.

An exemplary process flow diagram for process for treating wastewater 200 according to another embodiment of the present disclosure is shown in FIG. 4. Referring to FIG. 4, in the exemplified process 200, the wastewater is subjected to a microbial fuel cell process 202 as described herein to produce an acidic aqueous composition. The acidic aqueous composition is treated with a base comprising calcium (e.g. calcium oxide, calcium hydroxide or combinations thereof) to neutralize the acid 204. In the embodiment of the process shown in FIG. 4, treatment of the acidic aqueous composition with the base comprising calcium produces calcium sulfate, and the process comprises dissolving the calcium sulfate 206 to release calcium ions to produce the aqueous composition comprising calcium ions. The aqueous composition comprising calcium ions is subjected to a biological precipitation process 208 to precipitate the calcium ions as calcium carbonate. In the embodiment shown in FIG. 4, the process comprises calcination 210 of the precipitated calcium carbonate to produce calcium oxide which is recycled 212 for use in the neutralization 204 to treat the acidic aqueous composition. The water 214 obtained from the treatment is, for example, rendered fit for discharge. In the embodiment shown in FIG. 4, the wastewater is an aqueous composition comprising at least two dissolved metals. At least one of the dissolved metals is precipitated 216 as the metal or a complex thereof in the cathodic cell and at least one of the dissolved metals is deposited 218 as the metal or an oxide thereof on the cathode. Such embodiments may, for example, allow for separation of metals such as copper (via deposition on the cathode) from metals such as iron (via precipitation in the cathodic cell). Also depicted in FIG. 4 are embodiments wherein carbon dioxide 220A produced at the anode(s) or electrode(s), as the case may be, of the microbial fuel cell process 202 and/or carbon dioxide 220B produced during calcination is directed to a process comprising a carboxydogenic microorganism 222 to regenerate the organic substrate 224 for use in the process and wherein hydrogen 226 generated at the cathode of the microbial fuel cell process 202 is used as a fuel source 228 to maintain temperature 230 of the anodic cell in a range physiologically suitable for microorganisms housed therein. It will be appreciated by a person skilled in the art that embodiments shown in FIG. 4 can be varied as described herein.

The present disclosure also includes a use of a microbial fuel cell process in combination with a biological precipitation process for treatment of wastewater. In an embodiment, the treatment comprises a process for treating wastewater as described herein. For example, such uses may comprise any suitable embodiments as described herein in relation to the processes for treating wastewater of the present disclosure.

The following are non-limiting examples of the present disclosure:

EXAMPLES

Example 1: Microbial Fuel Cells

Figure 5:
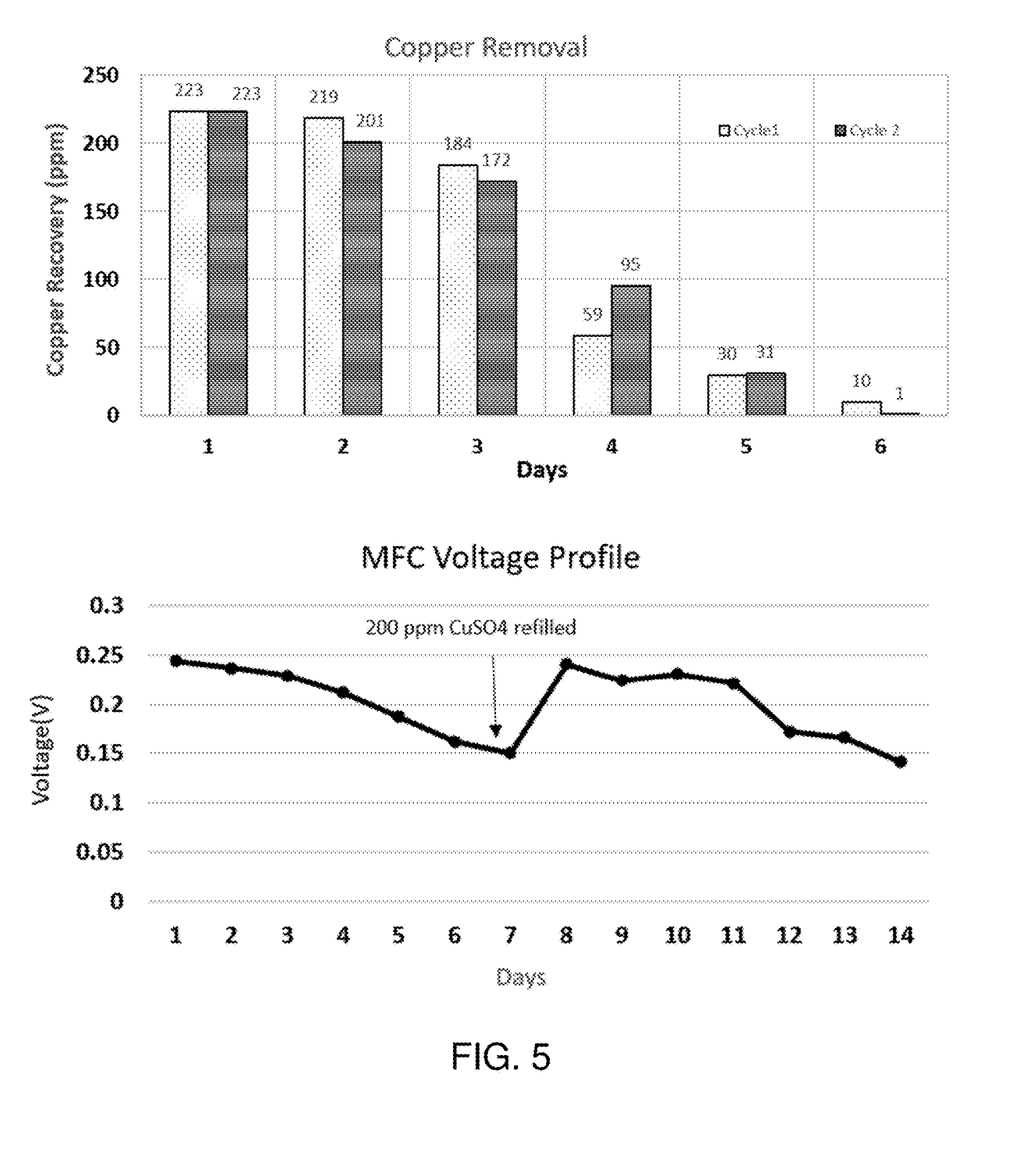
FIG. 5 shows copper recovery (ppm) as a function of time (days) for two exemplary cycles in a microbial fuel cell (MFC) according to an embodiment of the present disclosure (upper plot) and voltage (V) as a function of time (days) in the MFC according to an embodiment of the present disclosure. Arrow indicates refilling with 200 ppm $CuSO_4$.

Recovery of copper using a two-chamber, batch microbial fuel cell (MFC) having a total liquid volume of 250 mL was studied. The MFC was composed of an exoelectrogenic bacterial anodic culture and a standard cathodic chamber separated by a Nafion™ 117 membrane. The anode chamber was inoculated with *Shewanella oneidensis* MR-1 in minimum salt solution supplemented with lactate. A copper sulphate solution was introduced into the cathodic cell. The concentration of copper sulfate in the cathode chamber was adjusted to facilitate the thermodynamic favourability for reduction of copper. It was observed that when the pH of the catholyte exceeded 5, copper precipitated in the form of brochantite (copper oxide). This phenomenon was particularly pronounced when proton exchange membranes were used in the MFC. Within a span of 10-20 days, brochantite becomes highly visible on the cathode. Adjusting the pH to 3 initiated deposition of elemental copper. However, brochantite is also formed under these conditions. Lowering the pH further to 2 and adjusting the concentration of copper ions in the solution to 220 ppm or lower resulted in deposition of pure copper. To improve conductivity of cathode, graphene was rubbed onto the electrode's surface. This manipulation resulted in deposition of more than 90% of copper over period of 6 days (FIG. 5; upper plot). This was confirmed through clear traces of copper on the electrode surface and absorbance spectrometry results. FIG. 5 (lower plot) shows the voltage profile in the MFC; arrow indicates refilling with 200 ppm $CuSO_4$.

While the disclosure has been described with reference to what are presently considered to be the preferred examples, it is to be understood that the disclosure is not limited to the disclosed examples. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A process for treating wastewater, the process comprising:
    subjecting the wastewater to a microbial fuel cell process to produce an acidic aqueous composition;
    treating the acidic aqueous composition with a base comprising calcium to neutralize the acid and produce an aqueous composition comprising calcium ions; and
    subjecting the aqueous composition comprising calcium ions to a biological precipitation process to precipitate the calcium ions as calcium carbonate.

2. The process of claim 1, wherein the wastewater is an aqueous composition comprising dissolved metal and/or sulfate, and subjecting the aqueous composition comprising the dissolved metal and/or sulfate to the microbial fuel cell process produces an acidic aqueous composition having a reduced content of the dissolved metal and/or sulfate.

3. The process of claim 1, wherein the wastewater is mine wastewater.

4. The process of claim 3, wherein the mine wastewater is acid rock drainage.

5. The process of claim 1, wherein the process further comprises calcination of the precipitated calcium carbonate to produce calcium oxide.

6. The process of claim 5, wherein the process further comprises recycling the calcium oxide for use in treating the acidic aqueous composition.

7. The process of claim 2, wherein the microbial fuel cell process comprises a two-chambered microbial fuel cell or three-chambered microbial fuel cell.

8. The process of claim 7,
    wherein the microbial fuel cell process comprises the two-chambered microbial fuel cell and wherein:
    (a) the two-chambered microbial fuel cell comprises an anodic cell separated from a cathodic cell by a proton exchange membrane (PEM), the anodic cell comprising an anode, and housing an exoelectrogenic microorganism and an organic substrate therefor, and the cathodic cell comprising a cathode, and wherein the wastewater is introduced into the cathodic cell of the two-chambered microbial fuel cell;
    (b) the two-chambered microbial fuel cell comprises an anodic cell separated from a cathodic cell by an anion exchange membrane (AEM), the anodic cell comprising an anode, and housing a mixture of sulfate-reducing bacteria (SRB) and sulfide-oxidizing bacteria (SOB) and an organic substrate therefor, and the cathodic cell comprising a cathode, and wherein the wastewater is introduced into the cathodic cell of the two-chambered microbial fuel cell; or
    (c) the two-chambered microbial fuel cell comprises an anodic cell separated from a cathodic cell by an anion exchange membrane (AEM), the anodic cell comprising a first electrode and a second electrode, and housing an exoelectrogenic microorganism, a mixture of sulfate-reducing bacteria (SRB) and sulfide-oxidizing bacteria (SOB), and an organic substrate therefor, the first electrode proximal to the AEM and for catalyzing conversion of sulfate to sulfur and/or sulfides by the mixture of SRB and SOB, and the second electrode distal to the AEM and for catalyzing oxidation of the organic substrate by the exoelectrogenic microorganism, and the cathodic cell comprising a cathode, and wherein the wastewater is introduced into the cathodic cell of the two-chambered microbial fuel cell; or
    wherein the microbial fuel cell process comprises the three-chambered microbial fuel cell, wherein the three-chambered microbial fuel cell comprises a first anodic cell separated from a cathodic cell by a proton exchange membrane (PEM), the first anodic cell housing an exoelectrogenic microorganism and an organic substrate therefor, and a second anodic cell separated from the cathodic cell by an anion exchange membrane (AEM), the second anodic cell comprising a second anode and housing a mixture of sulfate-reducing bacteria (SRB) and sulfide-oxidizing bacteria (SOB) and an organic substrate therefor, and wherein the wastewater is introduced into the cathodic cell of the three-chambered microbial fuel cell.

9. The process of claim 8, wherein the exoelectrogenic microorganism comprises *Shewanella oneidensis*, *Geo-*

*bacter sulfurreducens, Desulfovibrio vulgaris* or combinations thereof; wherein the sulfide-oxidizing bacteria comprise *Acidithiobacillus, Aquaspirillum, Aquifex, Bacillus, Desulfobulbus, Chlorobium, Methylobacterium, Paracoccus, Pseudomonas, Starkeya, Thermithiobacillus, Xanthobacter* or combinations thereof; and/or wherein the sulfate-reducing bacteria comprise *Desulfovibrio*, optionally wherein the sulfate-reducing bacteria comprise *Desulfovibrio* and the sulfide-oxidizing bacteria comprise *Desolfobulbus*.

10. The process of claim 8, wherein the wastewater is an aqueous composition comprising dissolved metal and wherein at least one dissolved metal is deposited as the metal or an oxide thereof on the cathode and/or wherein at least one dissolved metal is precipitated as the metal or a complex thereof in the cathodic cell.

11. The process of claim 10, wherein the at least one metal or the oxide thereof deposited on the cathode comprises zinc, nickel, copper, mercury, silver, gold, uranium, arsenic, selenium, bismuth, molybdenum, manganese or combinations thereof.

12. The process of claim 10, wherein the process further comprises introducing oxygen into the cathodic cell to precipitate the metal or the complex thereof.

13. The process of claim 10, wherein the dissolved metal comprises dissolved copper and dissolved iron, at least a portion of the dissolved copper is deposited as copper metal on the cathode and at least a portion of the dissolved iron is precipitated as iron hydroxides and/or oxides in the cathodic cell.

14. The process of any one of claim 10, wherein the process further comprises recovering the at least one dissolved metal deposited as the metal or the oxide thereof and/or precipitated as the metal or the complex thereof.

15. The process of claim 8, wherein the process further comprises adjusting pH of the wastewater to a range of about 1.5 to about 3.5 prior to introduction into the cathodic cell.

16. The process of claim 5, wherein the process further comprises directing carbon dioxide produced during the process to a process comprising a carboxydogenic microorganism to regenerate the organic substrate for use in the process.

17. The process of claim 1, wherein treatment of the acidic aqueous composition with the base comprising calcium produces calcium sulfate, and the process further comprises dissolving the calcium sulfate to release calcium ions and produce the aqueous composition comprising calcium ions.

18. The process of claim 1, wherein the base comprising the calcium comprises calcium oxide, calcium hydroxide or combinations thereof, optionally wherein the base comprises the calcium oxide.

19. The process of claim 1, wherein the biological precipitation process comprises calcium precipitation that is microbially induced.

20. The process of claim 19, wherein the microorganism for the calcium precipitation comprises *Sporosarcina pasteurii, Bacillus firmus* or combinations thereof.

* * * * *